United States Patent
Foslien et al.

(10) Patent No.: US 6,445,652 B1
(45) Date of Patent: Sep. 3, 2002

(54) TECHNIQUE FOR ELIMINATING END-OF-TRAVEL DEAD SPACE IN MEDIA AUTOCHANGERS

(75) Inventors: Wayne E Foslien; Robert W Luffel, both of Greeley; Matthias A Lester; Kelly J. Reasoner, both of Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/491,938

(22) Filed: Jan. 26, 2000

(51) Int. Cl.[7] .............................................. G11B 21/08
(52) U.S. Cl. .................................................. 369/30.78
(58) Field of Search ............................. 369/35, 36, 34, 369/38, 178, 191, 30.78; 360/92

(56) References Cited

U.S. PATENT DOCUMENTS

| | | | | |
|---|---|---|---|---|
| 4,911,506 A | * | 3/1990 | Stefan | 312/16 |
| 5,337,297 A | * | 8/1994 | Kvifte et al. | 369/36 |
| 5,940,354 A | * | 8/1999 | Inoue | 369/35 |
| 6,091,676 A | * | 7/2000 | Mochizuki | 369/34 |

FOREIGN PATENT DOCUMENTS

| EP | 0215767 A2 | 3/1987 |
|---|---|---|
| EP | 0427329 A2 | 5/1991 |

* cited by examiner

*Primary Examiner*—David Davis
(74) *Attorney, Agent, or Firm*—Kevin M. Hart

(57) ABSTRACT

A magazine assembly containing numerous media units is disposed adjacent to a picker assembly. One of the two assemblies is normally stationary, while the other assembly is a traveling assembly. In either case, the two assemblies cooperate with one another to selectively provide the picker assembly with access to the media units that are stored in the magazine assembly. A motion reversal assembly is coupled to the normally stationary assembly and is engageable by the traveling assembly when it enters an end portion of its excursion path. When the motion reversal assembly is so engaged, it moves the normally stationary assembly in the direction opposite to that of the traveling assembly's movement. The effect is an apparent increase in the traveling assembly's available excursion length, which makes it possible for the picker assembly to access media slots that would otherwise be disposed in the dead spaces located on either end of the traveling assembly's excursion path.

29 Claims, 9 Drawing Sheets

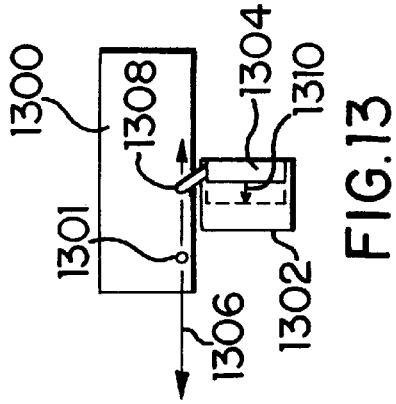
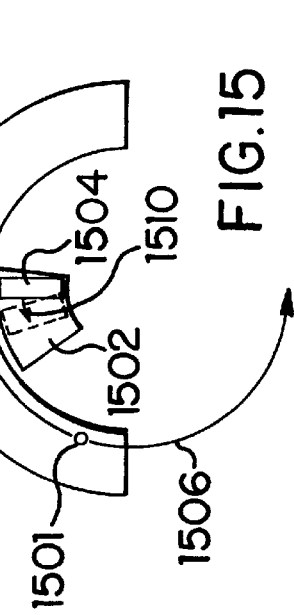
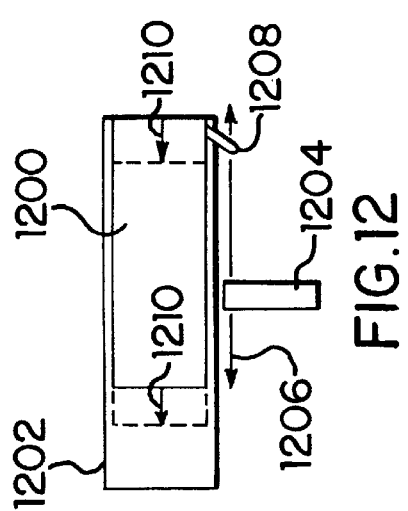
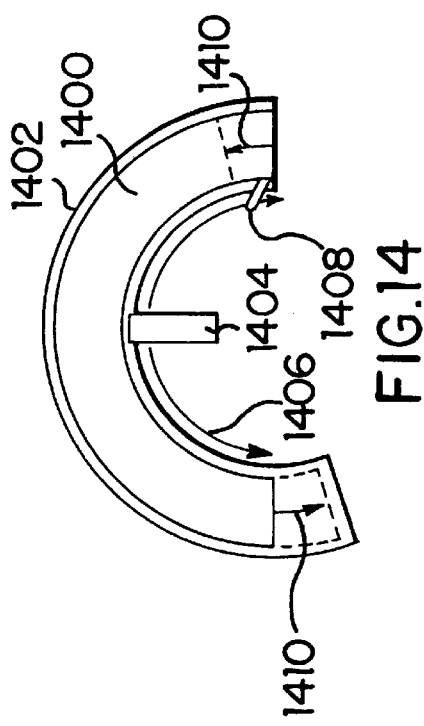

TECHNIQUE FOR ELIMINATING END-OF-TRAVEL DEAD SPACE IN MEDIA AUTOCHANGERS

FIELD OF THE INVENTION

This invention relates generally to electromechanical information storage systems. More particularly, the invention relates to media autochangers used in such systems.

BACKGROUND

Media Autochangers. Electromechanical information storage systems are commonly used, for example, to create automated libraries for data storage and backup. Many such automated libraries make use of one or more media autochangers, also known as media jukeboxes, to provide large storage capacity relatively inexpensively. In a media autochanger, numerous media units such as discs or tape cartridges can be stored and then independently selected by a picker mechanism for engagement with a drive. Because of the markets into which media autochangers are sold and the environments in which they are employed, it is important to maximize storage density in such systems while minimizing cost as much as possible.

One class of media autochangers seeks to address these concerns by employing a stationary picker assembly in conjunction with a traveling magazine of media units. A typical example of this class of autochangers has the media units mounted on a circular rotating carousel. A control mechanism is used to rotate the carousel until a desired media unit is located adjacent to the stationary picker assembly. The desired media unit is then accessed by the picker mechanism for read or write operations. Carousel designs such as these fail to maximize storage density because the media units in the carousel are necessarily angled relative to one another. This creates angular dead spaces between the media units.

In higher-end products of this class, the picker mechanism is capable of movement in a direction parallel to the carousel's axis of rotation but not along the arc of rotation. For example, the carousel can rotate about the z axis while the picker moves up or down in the z direction to access stacked discs or cartridges rotating on the carousel. (By way of background, it is believed that the Breece Hill Technologies, Inc. "SAGUARO" library and the Exabyte Corporation "690D" library both operate in this manner.) These devices remain within the general class of devices wherein the picker assembly is "stationary," because the picker assembly itself is not capable of movement in the direction of the magazine assembly. These higher-end products not only share the angular dead space problem with their lower-end counterparts, but they also suffer from higher cost associated with providing separate drive mechanisms for the picker and the carousel.

Another class of media autochangers employs a stationary media magazine in conjunction with a traveling picker assembly. In these systems, the media magazine takes the form of a linear array of media slots. In linear designs such as this, the picker assembly moves parallel to the axis of the media slot array from one end to the other in order to access the individual media units mounted therein. (By way of background, it is believed that the ADIC, Inc. "Fastor DLT7" autochanger operates in this manner.) The benefit of linear designs is that angular dead spaces between media units are inherently eliminated.

End-of-Travel Dead Space. One problem that is common to most of the linear designs is that of dead space on the ends of the picker's excursion path. A combination of motors, gears, tracks, circuit boards and housings are typically required to implement a picker and to define its excursion path. Consequently, the picker is usually wider than a media slot. In addition, the footprint of the components used to define the excursion path of the picker is usually longer than the length of the media magazine. These factors, either independently or in combination, inevitably impose a minimum on at least one dimension of the autochanger's enclosure. The result is that dead space occurs between the ends of the media magazine and the walls of the enclosure. For similar reasons, even autochangers of the carousel variety can suffer from the end-of-travel dead space problem if the carousel travels along a finite arc rather than in an endless circle.

It is therefore an object of the invention to enhance the storage density of media autochangers by eliminating end-of-travel dead space.

It is a further object of the invention to eliminate end-of-travel dead space according to a technique that can be applied in autochangers of the linear variety as well as to those of the carousel variety.

SUMMARY OF THE INVENTION

The invention includes numerous aspects, each of which contributes to achieving the above and other objects. In one aspect, a magazine assembly containing numerous media units is disposed adjacent to a picker assembly. One of the two assemblies is normally stationary, while the other assembly is a traveling assembly. In either case, the two assemblies cooperate with one another to selectively provide the picker assembly with access to the media units that are stored in the magazine assembly. A motion reversal assembly is coupled to the normally stationary assembly and is engageable by the traveling assembly when the traveling assembly enters an end portion of its excursion path. When the motion reversal assembly is so engaged, it moves the normally stationary assembly in the direction opposite to that of the traveling assembly's movement. The effect of this movement is an apparent increase in the traveling assembly's available excursion length. This makes it possible for the picker assembly to access media slots that would otherwise be disposed in the dead spaces located on either end of the traveling assembly's excursion path.

In media autochangers that employ the invention, additional media slots may be provided in the magazine without increasing the available excursion length of the traveling assembly or the area required to house the device. This achieves enhanced spacial and storage density.

BRIEF DESCRIPTION OF THE DRAWINGS

In FIG. 3, the magazine assembly is shown in a rest position. In FIG. 4, the magazine assembly is shown in a translated position.

FIG. 12 is a schematic diagram summarizing the embodiment shown in FIGS. 1–11.

FIG. 13 is a schematic diagram illustrating a second preferred embodiment of the invention in which the magazine assembly is a traveling assembly, the picker assembly is a normally stationary assembly, and the autochanger is of the linear variety.

FIG. 14 is a schematic diagram illustrating a third preferred embodiment of the invention in which the picker assembly is a traveling assembly, the magazine assembly is a normally stationary assembly, and the autochanger is of the carousel variety.

FIG. 15 is a schematic diagram illustrating a fourth preferred embodiment of the invention in which the magazine assembly is a traveling assembly, the picker assembly is a normally stationary assembly, and the autochanger is of the carousel variety.

DETAILED DESCRIPTION OF THE PREFERRED EMBODIMENTS

Embodiment One

Figure 1:
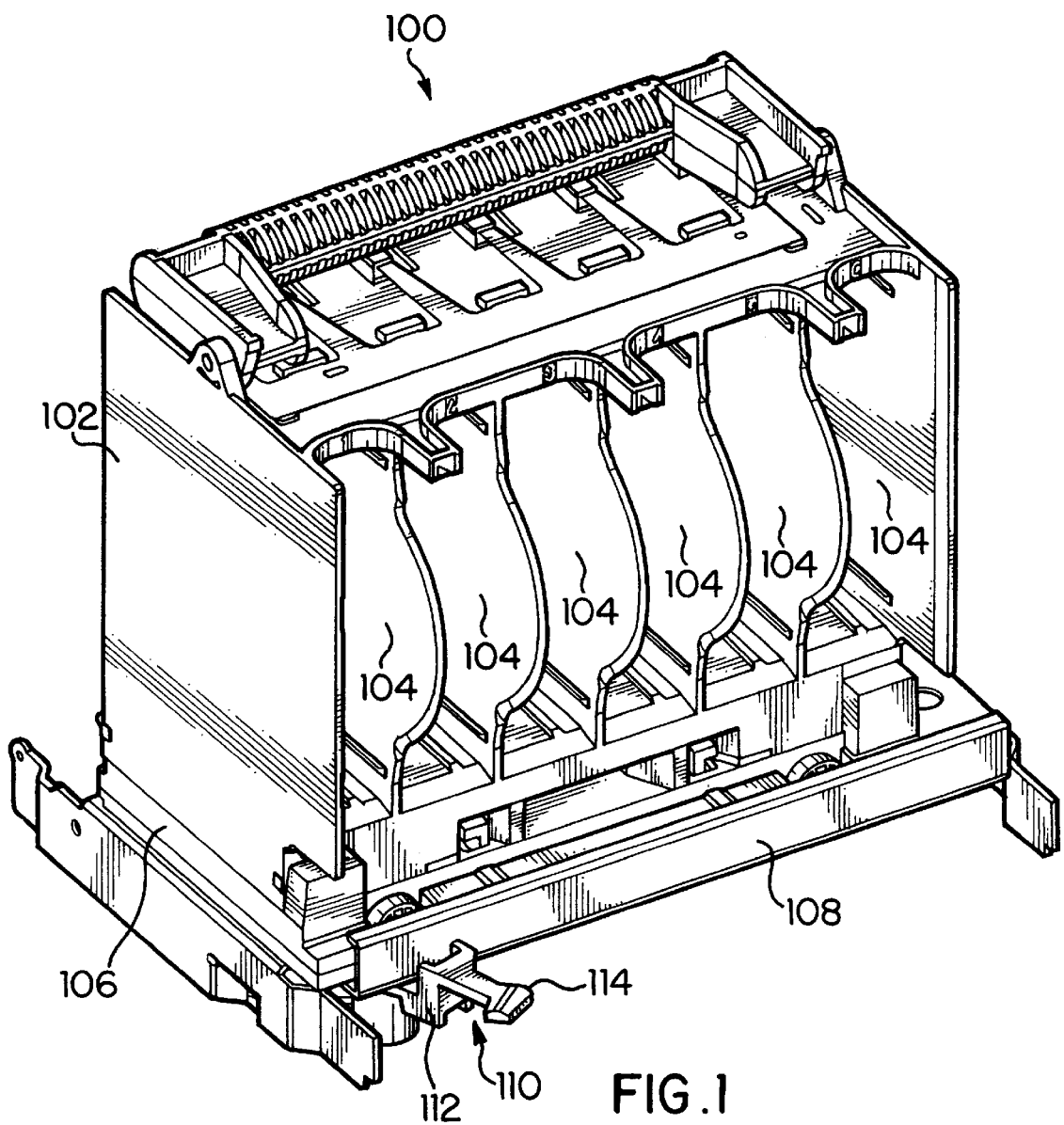
FIG. 1 is a top/front oblique view of a magazine assembly and a motion reversal assembly according to a first preferred embodiment of the invention.
Figure 2:
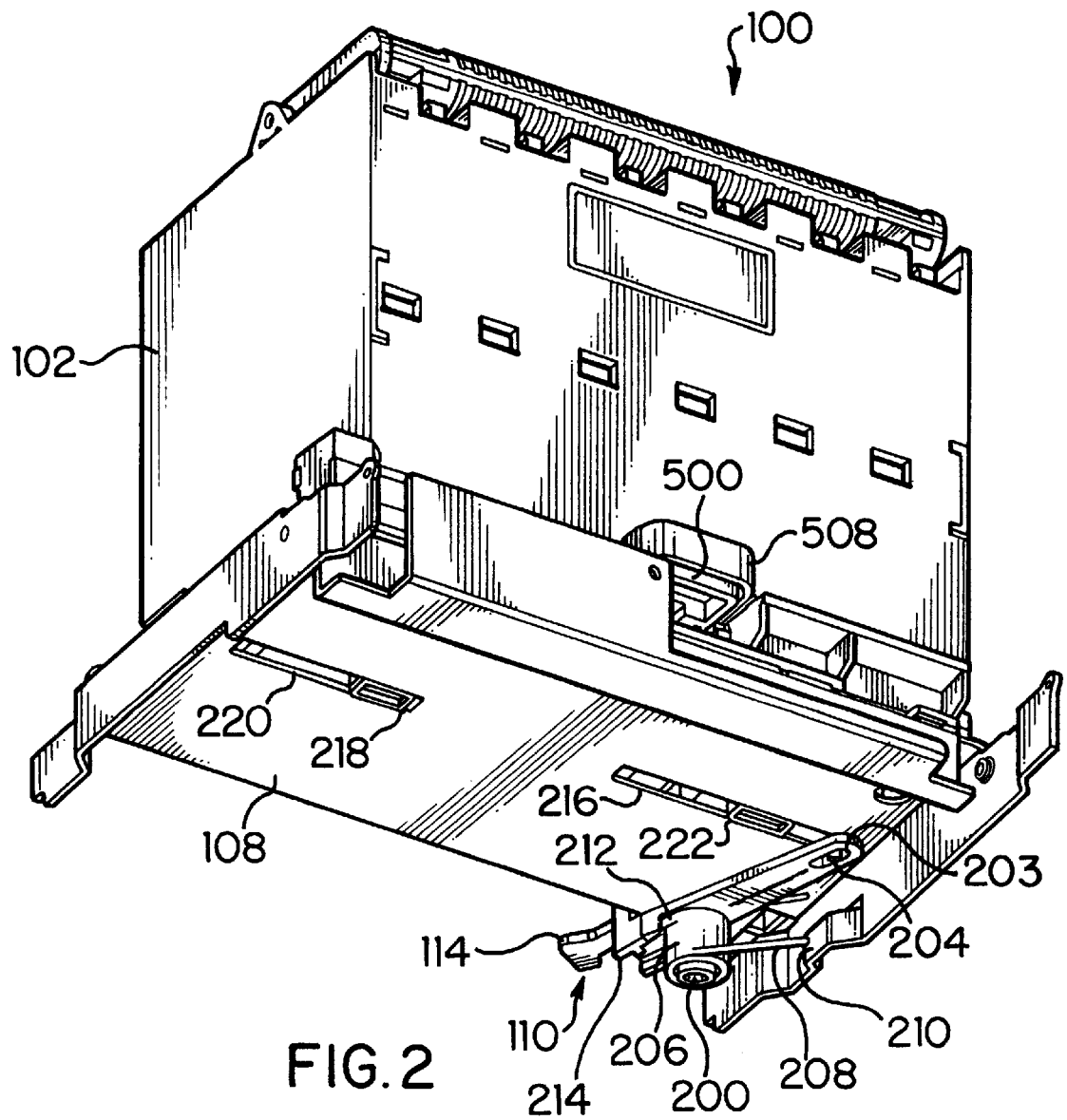
FIG. 2 is a bottom/rear oblique view of the apparatus of FIG. 1.

FIGS. 1 and 2 provide a structural overview of a magazine movement system 100 according to a first preferred embodiment of the invention in which the magazine assembly is a traveling assembly, the picker assembly is a normally stationary assembly, and the autochanger is of the linear variety. A magazine assembly 102 includes a linear array of media slots 104. Each media slot 104 may be used to contain one media unit. In the illustrated embodiment, each of slots 104 is configured to receive one tape cartridge. In other embodiments, slots 104 may be configured to receive media units of a type other than tape cartridges. Magazine 102 is removably mounted to a car 106. Car 106 is retained in a track 108. Track 108 is defines a linear path of movement for car 106.

In the embodiment shown, motion reversal assembly 110 is mounted to the bottom of track 108 and includes a lever 112 having an axis of rotation 200. Lever 112 has a slot 203 coupled to magazine assembly 102 via a pin 204 on the underside of car 106 as shown. (Other suitable coupling methods may also be used.) Lever 112 has a surface 114 that extends away from track 108 into the excursion path of a moving picker assembly. Further details about motion reversal assembly 110, including various alternative embodiments thereof, will be provided below.

Magazine assembly 102 is biased toward the rest position illustrated in FIGS. 1 and 2. In the embodiment shown, this biasing is accomplished with a torsion spring 206. Specifically, leg 208 of torsion spring 206 is retained by a notch 209 in bearing surface 210 on the underside of track 108, and leg 212 of torsion spring 206 is retained under a lip 214 on lever 112. This arrangement urges lever 112 toward the clockwise direction (viewed from beneath, as in FIG. 12), which in turn urges magazine assembly 102 toward the rest position illustrated in FIGS. 1 and 2. Other techniques may be used to bias magazine assembly 102 toward the rest position. Further movement of magazine assembly 102 by torsion spring 206 beyond the rest position is prevented by the engagement of pin 204 with the end of track slot 216 and by the engagement of car tab 218 with the end of track slot 220. During the movement of car 106 within track 108, car tabs 218, 222 travel within track slots 216, 220 to aid alignment of car 106 within track 108.

Figure 3:
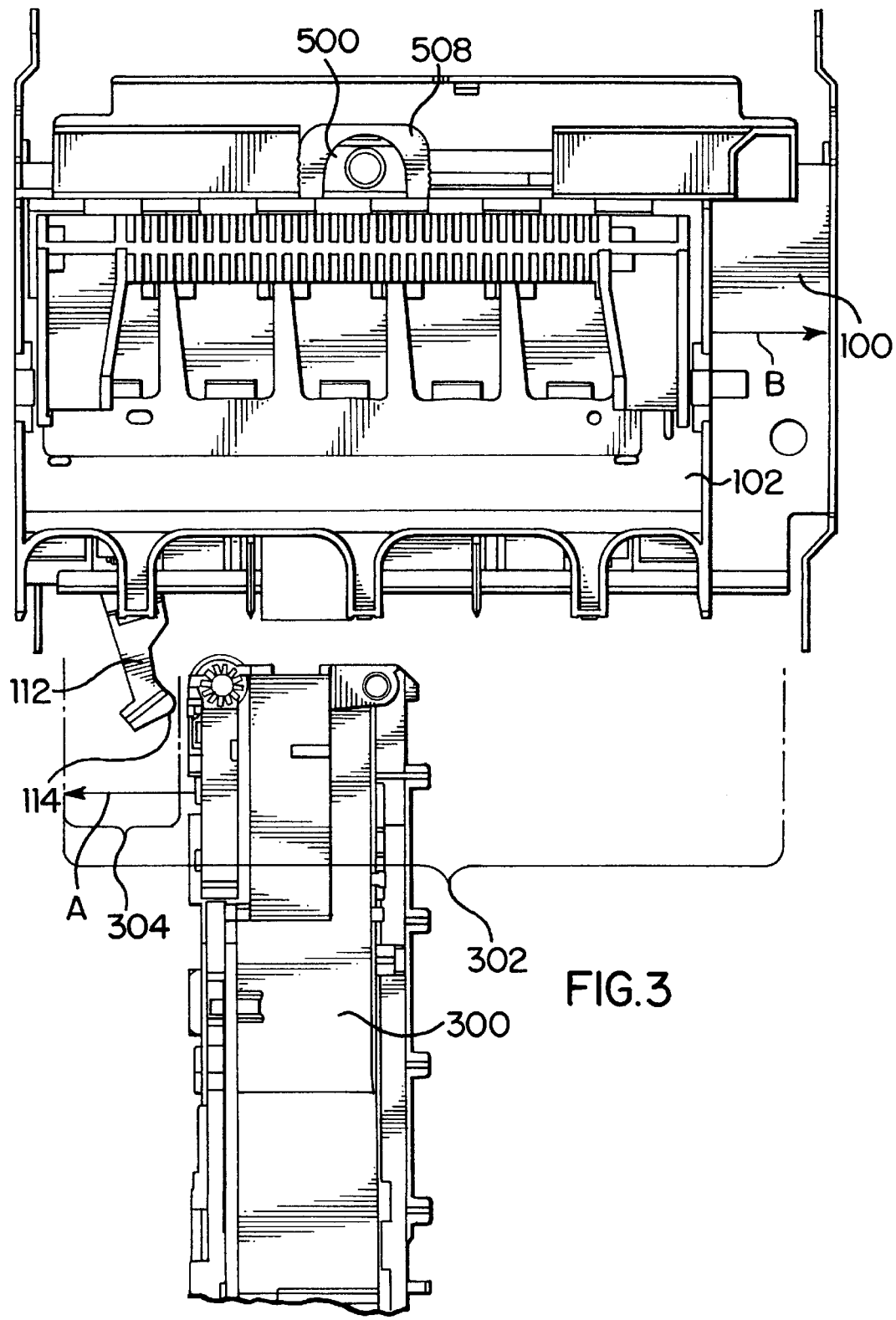
FIGS. 3 and 4 are top views of the apparatus of FIG. 1 disposed adjacent to a picker assembly according to a first preferred embodiment of the invention.
Figure 4:
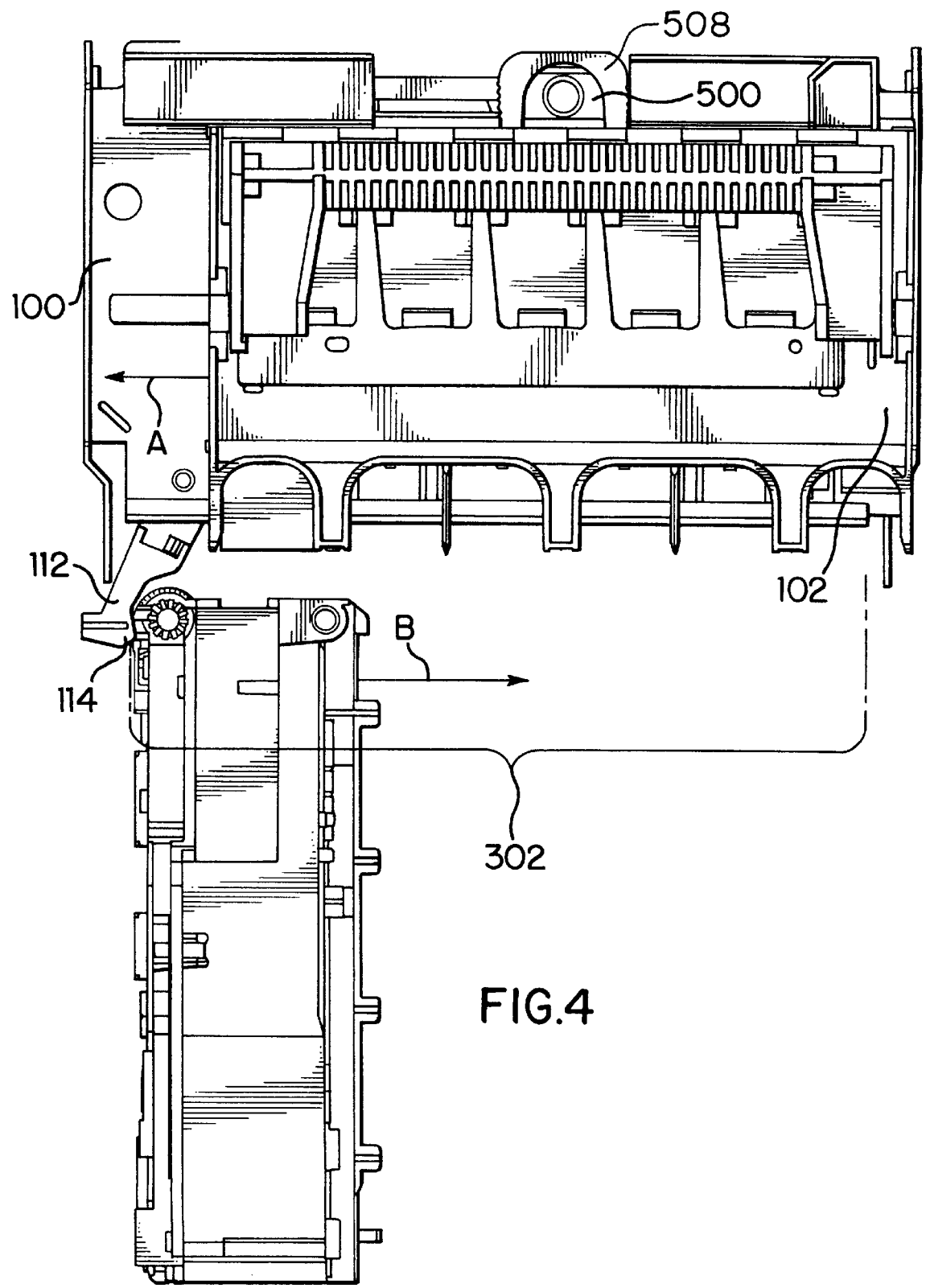

The preferred operation of magazine movement system 100 will now be described with reference to FIGS. 3 and 4. In FIGS. 3 and 4, magazine movement system 100 is shown adjacent to a traveling picker assembly 300. Picker assembly 300 has an excursion path 302 that includes an end portion 304. Surface 114 of lever 112 is disposed within end portion 304 of excursion path 302. In FIG. 3, magazine assembly 102 is shown in its rest position. When picker assembly 300 is caused to travel in direction A and to enter end portion 304 of excursion path 302, picker assembly 300 engages surface 114 of lever 112. This moves lever 112 in the clockwise direction (viewed from the top as in FIG. 3), which in turn moves magazine assembly 102 away from the rest position toward direction B. Direction B is opposite to the direction of movement of picker assembly 300.

Moving magazine assembly 102 and picker assembly 300 in opposite directions simultaneously reduces the excursion distance required for picker assembly 300 to reach the end-most slot in magazine assembly 102. For example, in the embodiment shown, the slot numbered "1" in magazine assembly 102 would be inaccessible by picker assembly 300 if it were not for magazine movement system 100. Preferably, an automatic control system should be provided and calibrated such that picker assembly 300 will stop its movement in direction A when it is aligned with the media slot numbered "1" as shown in FIG. 4. The implementation of such a control system will not be described herein; its details are beyond the scope of the invention, and persons of ordinary skill in the art will be able to utilize well-known techniques to construct it suitably without undue experimentation. It will suffice to note herein that the travel distance required for picker assembly 300 to move between adjacent media slots is larger when magazine assembly 102 is in the rest position, and smaller when magazine assembly 102 is moving away from the rest position in direction B. Any control system chosen for operating picker assembly 300 must take this difference into account.

When picker assembly 300 is caused to travel back away from end portion 304 toward direction B, torsion spring 206 moves magazine assembly 102 toward direction A, returning it to its rest position as soon as picker assembly 300 disengages from lever 112.

Figure 5:
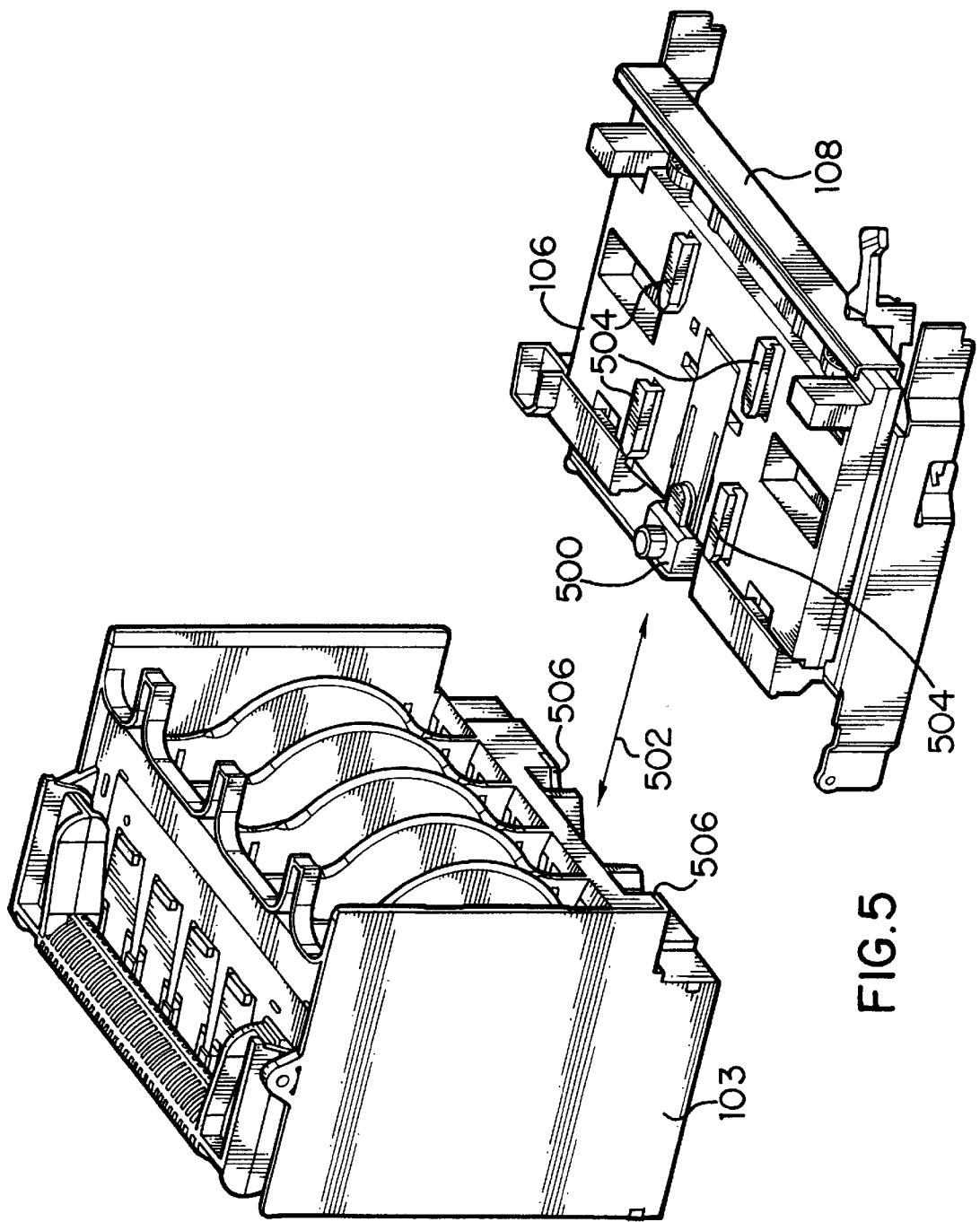
FIG. 5 is an exploded view of the magazine assembly system of FIG. 1, showing a car assembly and a removable magazine.
Figure 6:
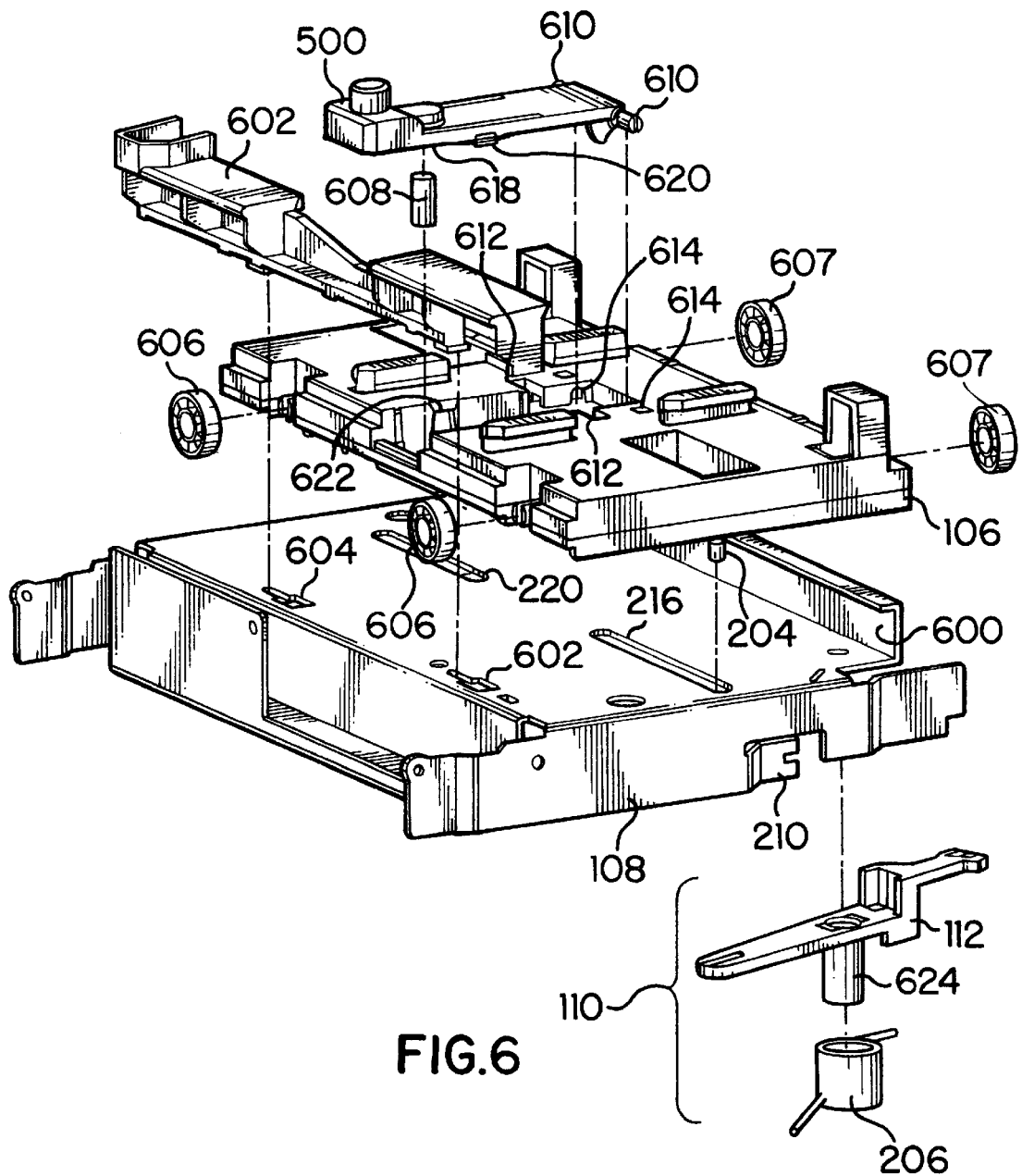
FIG. 6 is an exploded view of the car assembly of FIG. 5.
Figure 7:
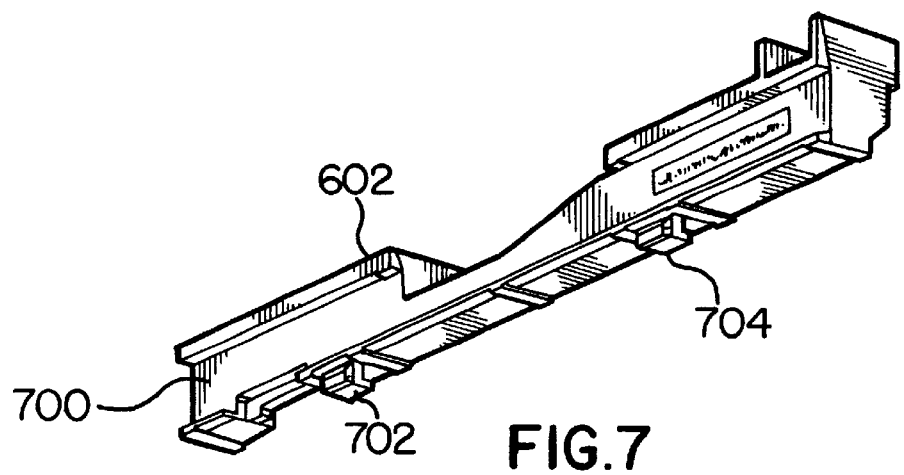
FIG. 7 is an oblique view of one of the wheel guides of the car assembly of FIG. 5.
Figure 8:
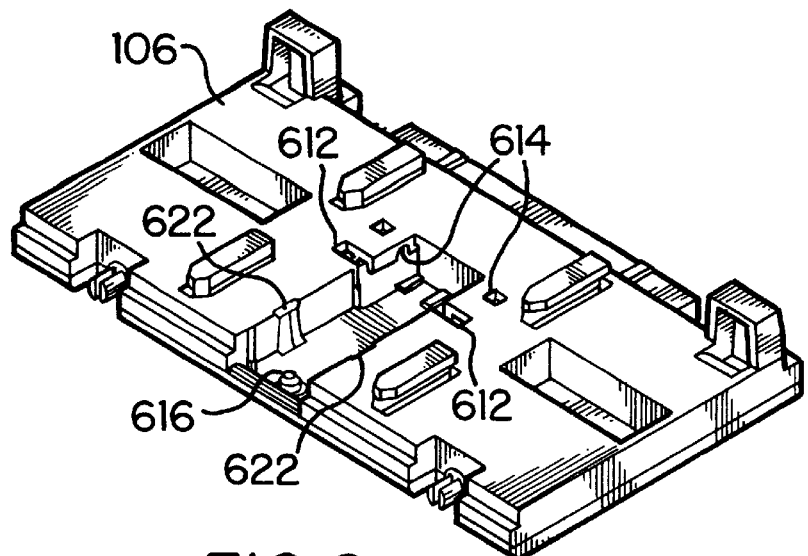
FIG. 8 is an oblique view of the car chassis of the car assembly of FIG. 5.
Figure 9:
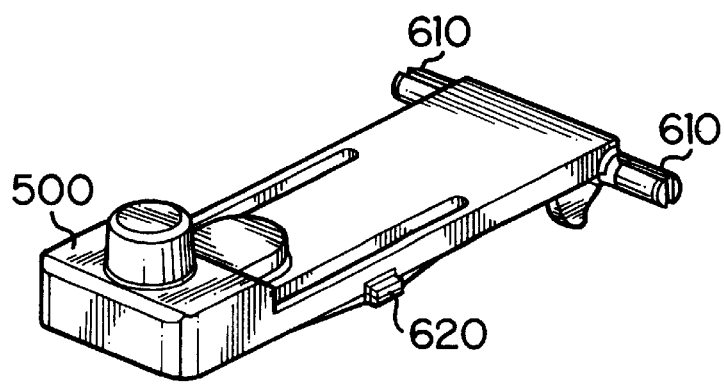
FIG. 9 is an oblique view of the magazine retention lock of the car assembly of FIG. 5.

Further structural details of magazine movement system 100 will now be described with reference to FIGS. 5–16. FIG. 5 illustrates an optional implementation of magazine assembly 102 in which magazine 103 is removable from car 106. In FIG. 5, magazine 103 has been removed from car 106 by depressing spring-loaded magazine lock 500 and sliding magazine 103 away from car 106 along the line indicated by arrow 502. Magazine 103 is mounted to car 106 by sliding it along line 502 so that lips 506 pass underneath retaining guides 504. As sliding continues, a beveled surface (not shown) on the underside of magazine 103 depresses lock 500. Finally, lock 500 snaps into a locked position within lock retainer area 508 on the back side of magazine 103. (See FIGS. 3 and 4.)

FIGS. 6–9 illustrate car 106 and track 108 in more detail. Magazine lock 500 may be installed onto car 106 by inserting axles 610 through clearance slots 612 and then pushing them backwards until they snap into axle retainers 614. A compression spring 608 is placed between lock 500 and car 106 and is retained by recess 616 on car 106 and by recess 618 on the underside of lock 500. Installation is completed by rotating lock 500 down on spring 608 until tabs 620 (one on either side of lock 500) snap into clearance holes 622 formed in car 106.

The material of track 108 defines a first wheel guide 600 along one side. (In the embodiment shown, track 108 and wheel guide 600 were fashioned from a single piece of sheet metal.) A second wheel guide 700 may be fashioned within elongate member 602. (In the embodiment shown, elongate member 602 was made of plastic.) After wheels 606 and 607 are snapped onto car 106 as shown, car 106 may be placed onto track 108. Wheels 607 should be retained within wheel guide 600; pin 204 should extend downward through track slot 216; and car tabs 218 and 222 should be disposed within track slots 220 and 216, respectively. Elongate member 602 should be mounted onto track 108 so that it retains wheels 606. (In the embodiment shown, elongate member 602 was mounted to track 108 by inserting mounting tabs 702, 704 into slots 602, 604. Other suitable attachment methods may, of course, be used.)

Figure 10:
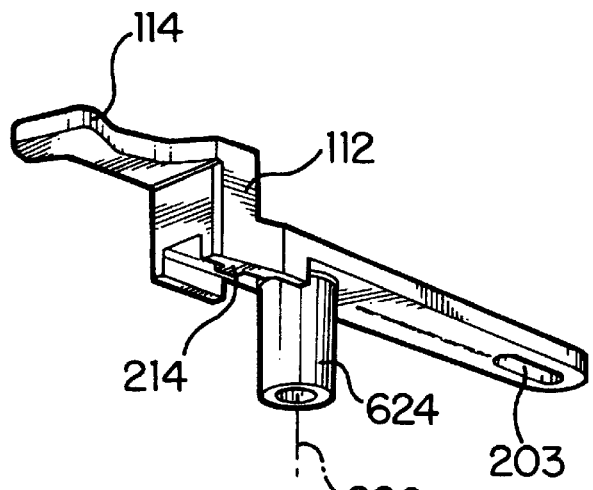
FIGS. 10 and 11 are oblique and orthogonal views, respectively, of the motion reversal lever of the car assembly of FIG. 5.
Figure 11:
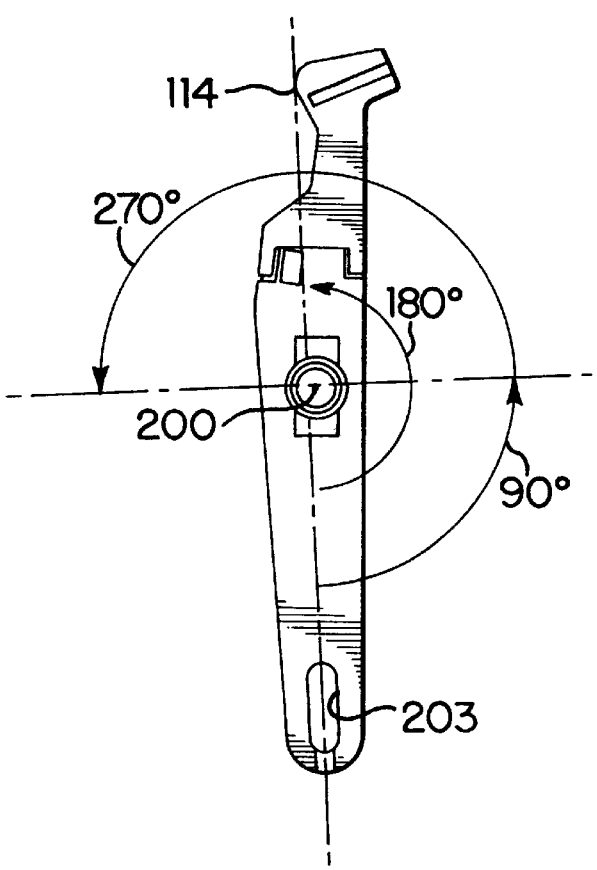

Motion reversal assembly 110 will now be discussed in detail with reference to FIGS. 10–11. In the embodiment shown, a single lever 112 is used to implement motion reversal assembly 110. Lever 112 and torsion spring 206 may be rotatably mounted to the underside of track 108 by any suitable means; for example, with a bolt. Cylindrical member 624 is disposed around axis of rotation 200 and fits inside torsion spring 206. Surface 114 should be disposed to engage picker assembly 300, and slot 203 should provide a sliding point of engagement between lever 112 and pin 204. In the embodiment shown, surface 114 and slot 203 are angularly displaced from one another by approximately 180 degrees relative to axis of rotation 200. The radii extending from axis of rotation 200 to surface 114 and slot 203 were chosen to be approximately equal. This arrangement provided the desired reversal of motion between picker and magazine in substantially a 1:1 ratio. Other radii and angular displacements may be chosen to achieve alternative ratios. It is believed, however, that in all embodiments that employ a single lever 112 to implement motion reversal assembly 110, best results will be obtained when surface 114 is angularly displaced from slot 203 by not more than 270 degrees and not less than 90 degrees, as indicated in FIG. 11.

Other means may be used to implement motion reversal assembly 110 depending on the geometry of the magazine and picker assemblies in a given media autochanger. For example, instead of using a single lever, multiple levers, gears, motors or solenoids may be used to accomplish the task of moving the normally stationary assembly in the opposite direction of the traveling assembly when the traveling assembly enters an end portion of its excursion path. It is believed, however, that the single lever implementation will yield desirable cost savings over the alternative means just described.

Schematic Summary of Embodiment One

FIG. 12 schematically summarizes the embodiment shown in FIGS. 1–11. A normally stationary magazine assembly 1200 is retained on a linear track 1202. A traveling picker assembly 1204 moves along an excursion path 1206 adjacent to magazine assembly 1200 to access media units mounted in magazine assembly 1200. When picker assembly 1204 travels to a point near the end of excursion path 1206, it engages motion reversal assembly 1208, which causes magazine 1200 to move in direction 1210 opposite to the direction of the picker assembly's movement. The result is to enable picker assembly 1204 to access one or more media slots in magazine assembly 1200 that would otherwise have been located in the picker assembly's dead space.

Alternative Embodiments

Several alternative embodiments of the invention will now be discussed schematically with reference to FIGS. 13–15.

Embodiment Two

In the embodiment of FIG. 13, a normally stationary picker assembly 1304 is retained on a linear track 1302. A traveling magazine assembly 1300 moves along an excursion path 1306 adjacent to picker assembly 1304 so that picker assembly 1304 may access media units mounted in magazine assembly 1300. When magazine assembly 1300 travels to a point near the end of excursion path 1306, point 1301 engages motion reversal assembly 1308, which causes picker assembly 1304 to move in direction 1310 opposite to the direction of the magazine assembly's movement. The result is to enable picker assembly 1304 to access one or more media slots in magazine assembly 1300 that would otherwise have been located in dead space.

Embodiment Three

In the embodiment of FIG. 14, a normally stationary magazine assembly 1400 is retained on a curved track 1402. A traveling picker assembly 1404 moves along an excursion path 1406 adjacent to magazine assembly 1400 to access media units mounted in magazine assembly 1400. When picker assembly 1404 travels to a point near the end of excursion path 1406, it engages motion reversal assembly 1408, which causes magazine assembly 1400 to move in direction 1410 opposite to the direction of the picker assembly's movement. The result is to enable picker assembly 1404 to access one or more media slots in magazine assembly 1400 that would otherwise have been located in the picker assembly's dead space.

Embodiment Four

In the embodiment of FIG. 15, a normally stationary picker assembly 1504 is retained on a curved track 1502. A traveling magazine assembly 1500 moves along an excursion path 1506 adjacent to picker assembly 1504 so that picker assembly 1504 may access media units mounted in magazine assembly 1500. When magazine assembly 1500 travels to a point near the end of excursion path 1506, point 1501 engages motion reversal assembly 1508, which causes picker assembly 1504 to move in direction 1510 opposite to the direction of the magazine assembly's movement. The result is to enable picker assembly 1504 to access one or more media slots in magazine assembly 1500 that would otherwise have been located in dead space.

While the invention has been described in detail in relation to preferred embodiments thereof, the described embodiments have been presented by way of example and not by way of limitation. It will be understood by those skilled in the art that various changes may be made in the form, details, materials and fastening techniques described above without deviating from the spirit and scope of the invention as defined by the appended claims. For example, the "tracks" described above may be implemented in any manner suitable for defining a linear or arcuate path of movement for the picker or magazine assemblies; it is believed that gear assemblies or alternative types of guide channels may produce acceptable results. In addition, the term "picker assembly" is intended herein to include any type of assembly that is cooperatively operable with a magazine assembly to access media units stored therein. Specifically, "picker assembly" is intended to include devices in which a read/write head is placed on or near the media units without withdrawing the media units from the magazine. The term "picker assembly" is also intended to include devices that remove media units from the magazine and place them in a drive.

We claim:

1. Apparatus for eliminating end-of-travel dead space in a media autochanger, comprising:

a traveling assembly having an excursion path with an end portion;

a normally stationary assembly cooperatively operable with the traveling assembly to selectively provide a picker with access to media units stored in a magazine; and a motion reversal assembly coupled to the normally stationary assembly and engageable by the traveling assembly when the traveling assembly enters the end portion of the excursion path, the motion reversal assembly operable when so engaged to move the normally stationary assembly in the opposite direction of the traveling assembly's movement.

2. The apparatus of claim 1, wherein the normally stationary assembly comprises the magazine and the traveling assembly comprises the picker.

3. The apparatus of claim 1, wherein the normally stationary assembly comprises the picker and the traveling assembly comprises the magazine.

4. The apparatus of claim 1, wherein the motion reversal assembly comprises a lever.

5. The apparatus of claim 1, wherein the normally stationary assembly is biased toward a rest position; and wherein the traveling assembly overcomes the bias when it enters the end portion of the excursion path.

6. The apparatus of claim 5, wherein the bias is a spring bias.

7. The apparatus of claim 4, wherein the lever is coupled to the normally stationary assembly at a first point and is engageable by the traveling assembly at a second point; and wherein the first and second points are angularly displaced from one another by an amount not less than 90 degrees and not more than 270 degrees relative to the lever's axis of rotation.

8. The apparatus of claim 7, wherein the first and second points are angularly displaced from one another by an amount substantially equal to 180 degrees relative to the lever's axis of rotation.

9. The apparatus of claim 1, wherein the excursion path is linear.

10. The apparatus of claim 1, wherein the excursion path is arcuate.

11. A method of eliminating end-of-travel dead space in a media autochanger of the type wherein a traveling assembly is cooperatively operable with a normally stationary assembly to provide picker access to media units stored in a magazine, the method comprising the steps of:

disposing a motion reversal assembly in an end portion of an excursion path of the traveling assembly;

causing the traveling assembly to travel into the end portion of the excursion path so that it engages the motion reversal assembly; and responsive to the traveling assembly's engagement with the motion reversal assembly, moving the normally stationary assembly from a rest position in a direction opposite to that of the traveling assembly's movement.

12. The method of claim 11, further comprising the steps of:

causing the traveling assembly to travel back out of the end portion of the excursion path so that it disengages the motion reversal assembly; and returning the normally stationary assembly to the rest position.

13. The method of claim 11, wherein the step of moving the normally stationary assembly comprises moving a magazine assembly.

14. The method of claim 11, wherein the step of moving the normally stationary assembly comprises moving a picker assembly.

15. The method of claim 11, wherein the step of moving the normally stationary assembly comprises moving the normally stationary assembly linearly.

16. The method of claim 11, wherein the step of moving the normally stationary assembly comprises moving the normally stationary assembly along an arc.

17. A magazine movement system for eliminating end-of-travel dead space in a media autochanger, comprising:

a magazine assembly biased toward a rest position and operable to store a plurality of media units accessible by a picker assembly that moves along an excursion path; and a motion reversal assembly having a first point coupled to the magazine assembly and a second point disposed to engage the picker assembly when it enters an end portion of the excursion path;

the motion reversal assembly operable, when engaged and moved by the picker assembly, to move the magazine assembly away from the rest position in the direction opposite to that of the picker assembly's movement.

18. The magazine movement system of claim 17, wherein the motion reversal assembly comprises a lever on which the first and second points are disposed;

wherein the lever has an axis of rotation; and wherein, relative to the axis of rotation, the first and second points are angularly displaced from one another by an amount not less than 90 degrees and not more than 270 degrees.

19. The magazine movement system of claim 18, wherein the first and second points are angularly displaced from one another relative to the axis of rotation by an amount substantially equal to 180 degrees.

20. The magazine movement system of claim 17, further comprising a track; and wherein the magazine assembly comprises a car that is retained within the track.

21. The magazine movement system of claim 20, wherein the magazine assembly comprises a magazine that is removably mountable to the car.

22. The magazine movement system of claim 20, wherein the track defines a linear path of movement for the car.

23. The magazine movement system of claim 20, wherein the track defines an arcuate path of movement for the car.

24. A picker movement system for eliminating end-of-travel dead space in a media autochanger, comprising:
- a picker assembly biased toward a rest position and operable to access a plurality of media units mounted in a magazine assembly that moves along an excursion path; and
- a motion reversal assembly having a first point coupled to the picker assembly and a second point disposed to engage the magazine assembly when it enters an end portion of the excursion path;
- the motion reversal assembly operable, when engaged and moved by the magazine assembly, to move the picker assembly away from the rest position in the direction opposite to that of the magazine assembly's movement.

25. The picker movement system of claim 24,
wherein the motion reversal assembly comprises a lever on which the first and second points are disposed;
wherein the lever has an axis of rotation; and
wherein, relative to the axis of rotation, the first and second points are angularly displaced from one another by an amount not less than 90 degrees and not more than 270 degrees.

26. The picker movement system of claim 25,
wherein the first and second points are angularly displaced from one another relative to the axis of rotation by an amount substantially equal to 180 degrees.

27. The picker movement system of claim 24,
further comprising a track; and
wherein the picker assembly comprises a car that is retained within the track.

28. The magazine movement system of claim 27,
wherein the track defines a linear path of movement for the car.

29. The magazine movement system of claim 27,
wherein the track defines an arcuate path of movement for the car.

* * * * *